United States Patent
Lee et al.

(10) Patent No.: US 9,940,488 B2
(45) Date of Patent: Apr. 10, 2018

(54) DUAL VIDEO PIPE WITH OVERLAP FILTERING

(71) Applicant: STMICROELECTRONICS (RESEARCH & DEVELOPMENT) LIMITED, Marlow Bucks (GB)

(72) Inventors: David Lee, Westfield (GB); David Grant, Edinburgh (GB)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 113 days.

(21) Appl. No.: 14/854,211

(22) Filed: Sep. 15, 2015

(65) Prior Publication Data
US 2016/0180490 A1    Jun. 23, 2016

(30) Foreign Application Priority Data
Dec. 18, 2014 (GB) .................................. 1422655.9

(51) Int. Cl.
*G06T 1/60* (2006.01)
*G06K 7/016* (2006.01)

(52) U.S. Cl.
CPC .............. *G06K 7/0166* (2013.01); *G06T 1/60* (2013.01)

(58) Field of Classification Search
CPC ....................................................... G06T 1/60
See application file for complete search history.

(56) References Cited

U.S. PATENT DOCUMENTS

| | | | | |
|---|---|---|---|---|
| 2002/0097241 A1* | 7/2002 | McCormack | ........... | G06T 11/40 345/423 |
| 2003/0107578 A1* | 6/2003 | Willis | ................. | G06F 12/1027 345/545 |
| 2003/0227460 A1* | 12/2003 | Schinnerer | ............. | G09G 5/363 345/539 |
| 2004/0056864 A1* | 3/2004 | Valmiki | .................. | G06T 9/007 345/531 |
| 2008/0049037 A1* | 2/2008 | Kurupati | ................... | G06T 1/60 345/560 |
| 2012/0050820 A1* | 3/2012 | Ashida | ............... | H04N 1/40068 358/447 |
| 2014/0204005 A1 | 7/2014 | Wyatt et al. | | |

FOREIGN PATENT DOCUMENTS

| | | |
|---|---|---|
| EP | 0048350 A1 | 3/1982 |
| EP | 1037458 A1 | 9/2000 |

* cited by examiner

*Primary Examiner* — Vu Nguyen
*Assistant Examiner* — Jonathan M Cofino
(74) *Attorney, Agent, or Firm* — Slater Matsil, LLP

(57) ABSTRACT

A method includes receiving image information related to a first plurality of pixels at a first data pathway, receiving image information related to a second plurality of pixels at a second data pathway, where the first plurality of pixels and the second plurality of pixels include a shared plurality of pixels. The method also includes performing image processing in dependence on image information related to the shared plurality of pixels, and combining data output from the first and second data pathways into a stream of data where the stream output is generated using a first clock frequency which is substantially the same as that used in the first and second data pathways.

25 Claims, 15 Drawing Sheets

DUAL VIDEO PIPE WITH OVERLAP FILTERING

TECHNICAL FIELD

The present invention relates to dual video pipe with overlap filtering.

BACKGROUND

Existing systems receive and process image data from a pixel array in order to produce a video display. Typically, the image data from the pixel array is transported through a video pipe and processed to produce a frame of the video display.

SUMMARY

In a first embodiment, a method includes receiving image information related to a first plurality of pixels at a first data pathway, receiving image information related to a second plurality of pixels at a second data pathway, wherein the first plurality of pixels and the second plurality of pixels comprise a shared plurality of pixels. The method may also include performing image processing that is dependent on image information related to the shared plurality of pixels, combining data output from the first and second data pathways into a stream of data where the stream output is generated using a first clock frequency which is substantially the same as that used in the first and second data pathways, and the image processing may include kernel image processing.

In addition, the method may include receiving the image information relating to the first plurality of pixels from a first SRAM and receiving the image information relating to the second plurality of pixels from a second SRAM. The number of the first plurality of pixels and the number of the second plurality of pixels may be equal. In another embodiment, the first plurality of pixels and the number of the second plurality of pixels may be different.

The method may also include buffering the image information relating to the shared plurality of pixels in parallel to the image information relating to the rest of the first plurality of pixels and the second plurality of pixels.

In a particular embodiment, an apparatus includes means or circuitry for receiving image information related to a first plurality of pixels at a first data pathway and means or circuitry for receiving image information related to a second plurality of pixels at a second data pathway, wherein the first plurality of pixels and the second plurality of pixels comprise a shared plurality of pixels. The apparatus may also include means or circuitry for performing image processing that is dependent on image information related to the shared plurality of pixels, and a combination function configured to combine the data output from the first and second data pathways into a stream of data where the stream output is generated using a first clock frequency which is substantially the same as that used in said first and second data pathways. The image processing may comprise kernel image processing.

In addition, the apparatus may include means or circuitry for receiving the image information relating to the first plurality of pixels from a first SRAM and means or circuitry for receiving the image information relating to the second plurality of pixels from a second SRAM. The number of the first plurality of pixels and the number of the second plurality of pixels may be equal. In another embodiment, the first plurality of pixels and the number of the second plurality of pixels may be different. The apparatus may include means or circuitry for buffering the image information relating to the shared plurality of pixels in parallel to the image information relating to the rest of the first plurality of pixels and the second plurality of pixels.

In a particular embodiment, an apparatus includes a pixel array for receiving image information related to a first plurality of pixels at a first data pathway and for receiving image information related to a second plurality of pixels at a second data pathway, wherein the first plurality of pixels and the second plurality of pixels comprise a shared plurality of pixels. The apparatus may also include an image display module for performing image processing that is dependent on image information related to the shared plurality of pixels. The apparatus may include at least one of a mobile terminal, a smart phone, a tablet, a computer and a camera.

In a particular embodiment, a computer program product includes a non-transitory computer readable medium having executable instructions that when executed are configured to cause one or more processors to receive image information related to a first plurality of pixels at a first data pathway, receive image information related to a second plurality of pixels at a second data pathway, wherein the first plurality of pixels and the second plurality of pixels comprise a shared plurality of pixels, and perform image processing that is dependent on image information related to the shared plurality of pixels.

In the above, many different embodiments have been described. It should be appreciated that further embodiments may be provided by the combination of any two or more of the embodiments described above.

BRIEF DESCRIPTION OF THE DRAWINGS

Embodiments will now be described by way of example to the accompanying drawings in which.

DETAILED DESCRIPTION

Figure 1:
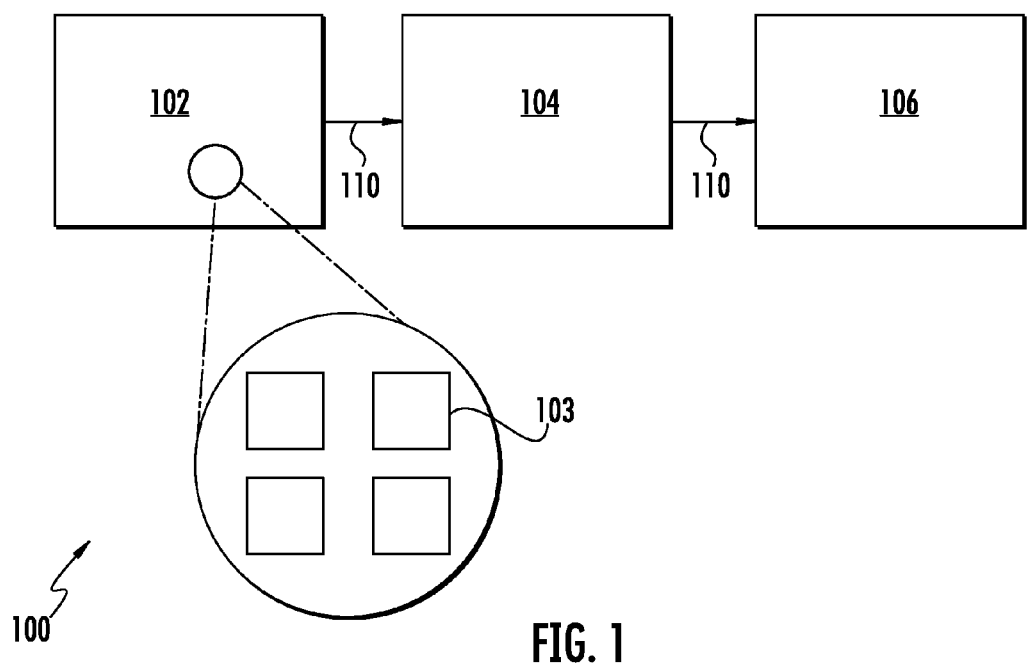
FIG. 1 shows an example imaging system.

FIG. 1 shows an imaging system 100. The imaging system includes a pixel array 102, image processing module 104 and display module 106. The imaging system 100 may contain hardware and/or firmware for system control and/or image processing. The pixel array 102 is made up of an array of photodiodes 103. The photodiodes may have different filters on them. For example, pixel diodes may be associated with a red filter or a green filter and may be referred to as a red pixel or a green pixel. When light is incident on the photodiode, it produces a signal. The signal data is read from the photodiode and processed to produce an image. Processing may deal with one or more of pixel defects, coloration, vignettes, etc.

It should be appreciated that in other embodiments, other colors of filters may alternatively or additionally be provided. In some embodiments, no filter may be provided on some or all of the pixel diodes.

The pixel array may be configured to capture an image.

Once the signal data has been processed, the produced image is displayed using display module 106. To produce a video display on display module 106, sequential images are displayed using display module 106 at a particular frame rate.

The signal data passes along a data pathway, or pipeline 110, from the pixel array 102 to the image processing module 104 and subsequently to the display module 106.

The data in the path or pipeline undergoes a series of processing stages.

Both pixel array size and frame rate requirements are increasing. Increasing the pixel array size increases the number of photodiodes and thus the number of signals, i.e., the amount of data that must be processed to produce an image, adding an increased burden to the image processing. As frame rate requirements increase, the rate at which data must be processed to produce frames at the required rate increases. That is, the amount of data, (d), and/or the rate at which data is processed, which may be represented by clock speed (f), increases. This may result in an increase in bandwidth (B) requirements (where B≤d*f) in the order of Mbps to Gbps. Bandwidth is defined here as the rate at which data is processed or, the amount of data that can be processed in a time period.

It should be appreciated that other embodiments may have lower or higher bandwidths.

In order to accommodate increased bandwidth requirements, the clock speed of a video processing pipeline can be increased. However, the amount by which the clock speed of a pipeline can be increased may be limited by image processing speeds. Increasing clock speeds of a pipeline may increase power consumption which may be seen as undesirable.

Figure 2:
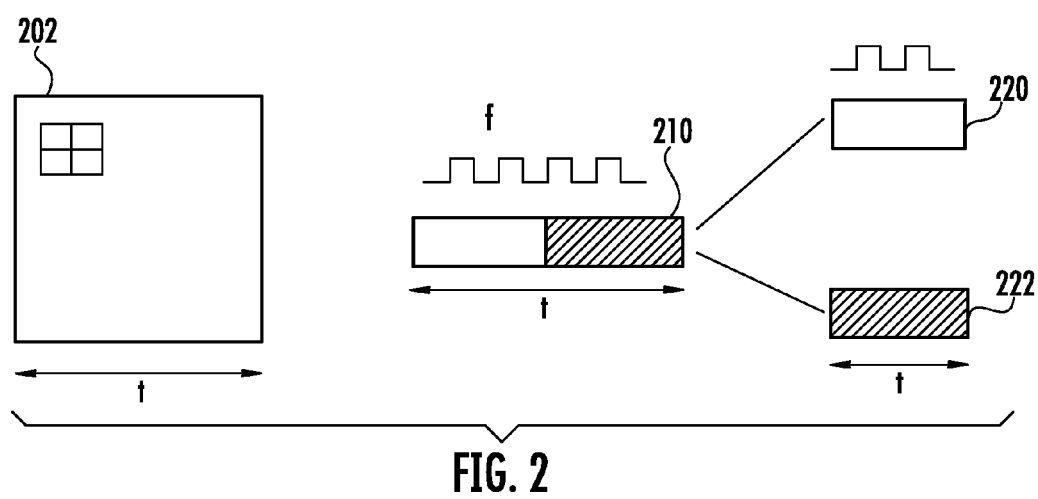
FIG. 2 shows a schematic diagram of a video pipe arrangement.

An alternative method of meeting increased bandwidth requirements is to share data across parallel processing paths, or pipelines. FIG. 2 shows a schematic representation of a system in which, rather than the data from a pixel array 202 passing through a single pipeline 210 with a clock speed (f) for a time (t), half of the data from pixel array 202 passes through first pipeline 220 and half of the data passes through second pipe 222. The clock speed of the pipeline 220 and pipeline 222 is f/2. That is, clock speed is halved in comparison to the situation where all the data passes through a single pipeline 210. Sharing data across pipelines is scalable, so long as the bandwidth is balanced. For example, for four video pipelines, B≤4*(d/4*f/4). The number of pipelines may be proportional to 1/clock speed.

Figure 3:
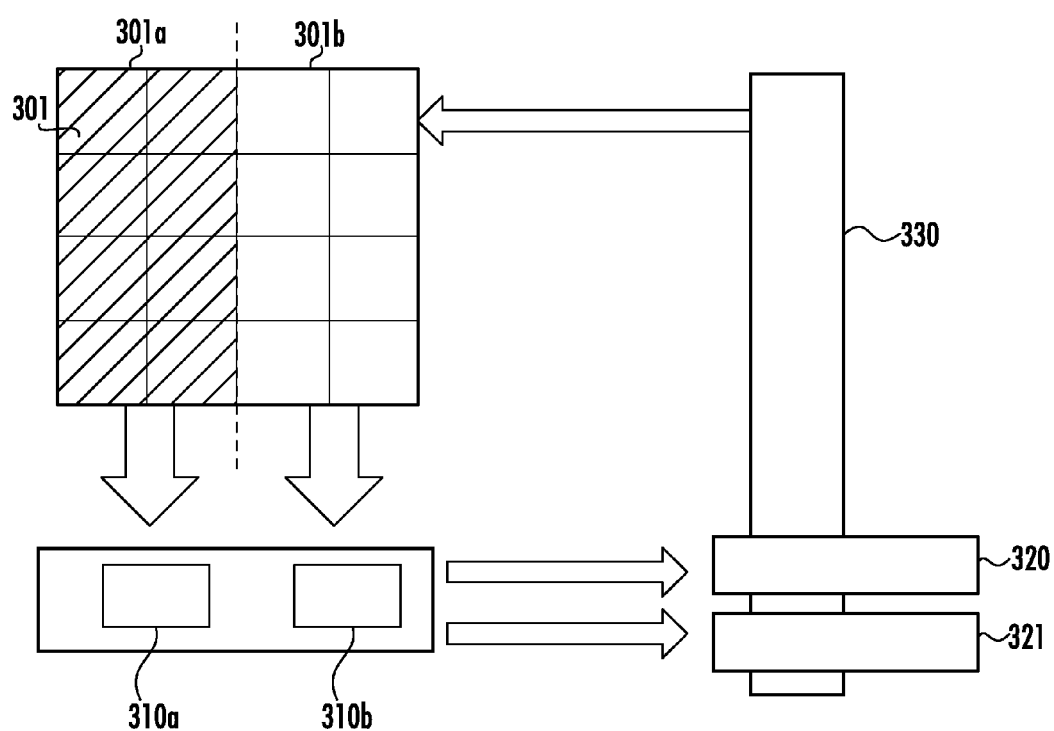
FIG. 3 shows a block diagram of a readout from a pixel array.

FIG. 3 shows a schematic representation of data being read from a pixel array 301. To obtain the data for parallel image processing paths, an image may be sampled into a plurality of SRAMs. Each SRAM may cover a portion of the array. The readout from each SRAM provides the data for a respective video pipe. FIG. 3 shows an example arrangement in which the array 301 is split into two, equally sized, sub arrays, sub-array 301a and sub-array 301b. The first sub-array 301a is sampled into a first SRAM 310a, and the second sub-array 301b is sampled into a second SRAM 310b. The first SRAM 310a reads out to video pipe 320 and the second SRAM 310b reads out to video pipe 321. The arrangement comprises video timing module 330, which can control array and SRAM addressing. Although SRAMs are shown in the arrangement of FIG. 3, any suitable memory storage may be appropriate. There are multiple possibilities for readout directions.

It should be appreciated that the number of processing pipes required may be determined by the amount of data coming from the pixel array. Hence the pixel array size and the desired frame-rate define the bandwidth for the system in some embodiments.

For example, an 8 Mpixel array outputting at 30 frames per second (fps), with 10 bits-per-pixel gives 2.4 Gbps of data (240 Mpixels-per-second) for the rest of the system to handle.

For 1 pixel per clock cycle, one pipe at 240 MHz may be enough for a working system. However, if the internal system processing frequency is limited to say 200 MHz, more pipes at a slower frequency are required, for example two pipes at 120 MHz.

If four processing pipes in the same system are provided, four SRAM outputs from the pixel array may be required to feed them. However, since the pixel array size and frame rate requirement have not changed, the bandwidth to be accommodated is still 240 Mpps. Each of the four pipes will therefore run at 60 MHz.

A region of interest (ROI), i.e. the portion of pixels of the array which are used to produce an image, may not comprise all of the pixels of the array. In addition, the ROI may be positioned respective to the array such that it is not split equally over sub-arrays 301a and 301b. As a result, the amount of data stored in each memory corresponding to a sub array, e.g., SRAM 301a and SRAM 310b, and thus the amount of data readout to the image processing pipelines 320 and 321, may not be equal.

Figure 4C:
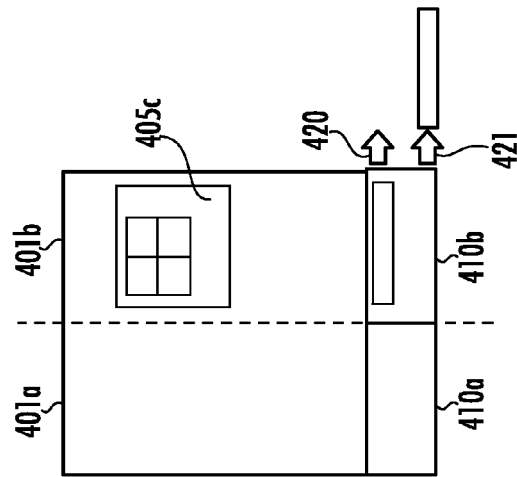
FIGS. 4a to 4c show a block diagram of an alternative readout from a pixel array.
Figure 4B:
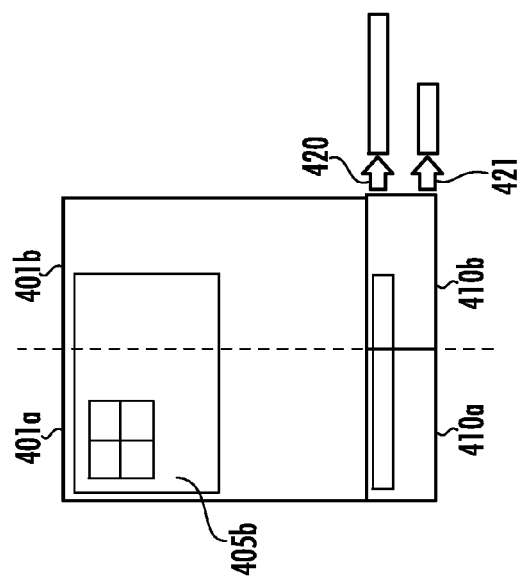
Figure 4A:
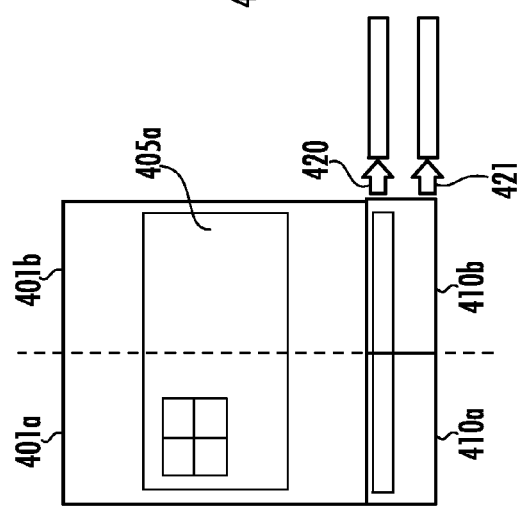

FIGS. 4a, 4b and 4c show pixel readout arrangements such as that of FIG. 3, with alternative positions of a ROI in a pixel array.

In FIG. 4a, the ROI 405a is equally spilt across sub-array 401a and sub-array 401b. As a result, the amount of data in SRAM 410a and the amount of data in SRAM 410b and thus in pipeline 420 and pipeline 421, respectively, will be equal.

In FIG. 4b, the ROI 405b is positioned such that there are more pixels of interest in the first sub-array 401a. Thus, there will be more data in the first SRAM 410a and in the first pipeline 420 than in the second SRAM 410b and the second pipeline 421. Pixel array readout DAC ramp time is the primary constraint on a line time so there is no frame rate impact from unbalanced pipes.

In FIG. 4c, all of the pixels of the ROI 405c are in the second sub-array 401b. Thus, there will be no data read from the first sub-array 401a and thus in the first pipe 420. If a pipe has no data, it may be possible to switch off that pipe for power saving, or let synthesis automatic clock gating handle it to reduce system overhead.

Figure 5:
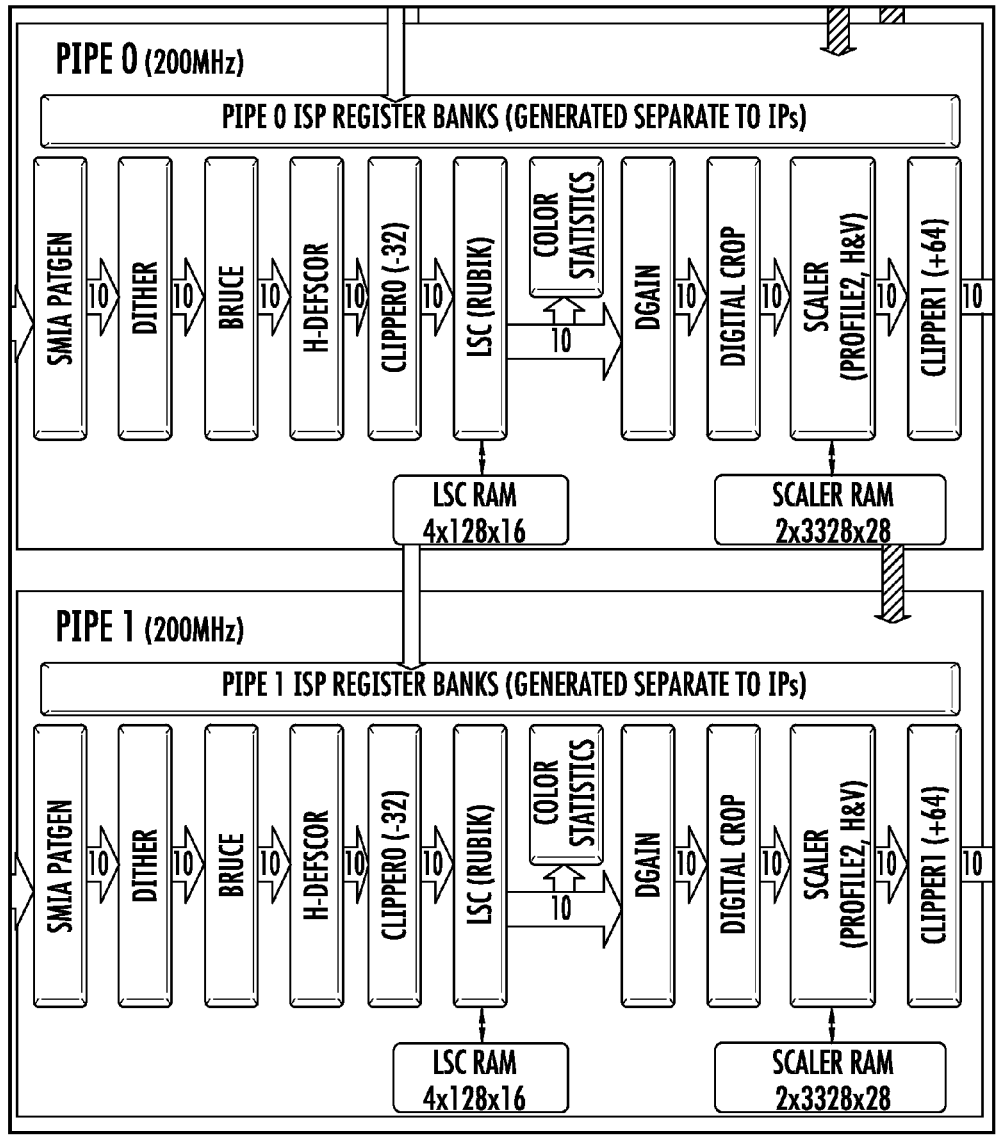
FIG. 5 shows a block diagram of image processing modules.

Image processing of the data may take place while the data is in parallel data pipes such as those shown in FIGS. 2 and 3. FIG. 5 shows a simplified block diagram of some of the functional image processing modules. Image processing may involve accounting for at least one of lens shading, colorization, pixel defects and the like. Each pipe operates independently but may have matching functional blocks as can be seen in FIG. 5. Some image processing function configurations may be identical between pipes. Most image processing will operate on the data stream in the same way for single and multiple pipe systems. The system may need to adjust some image processing configurations for individual pipes to reflect a specific image region where the data is from, in some embodiments.

Figure 6:
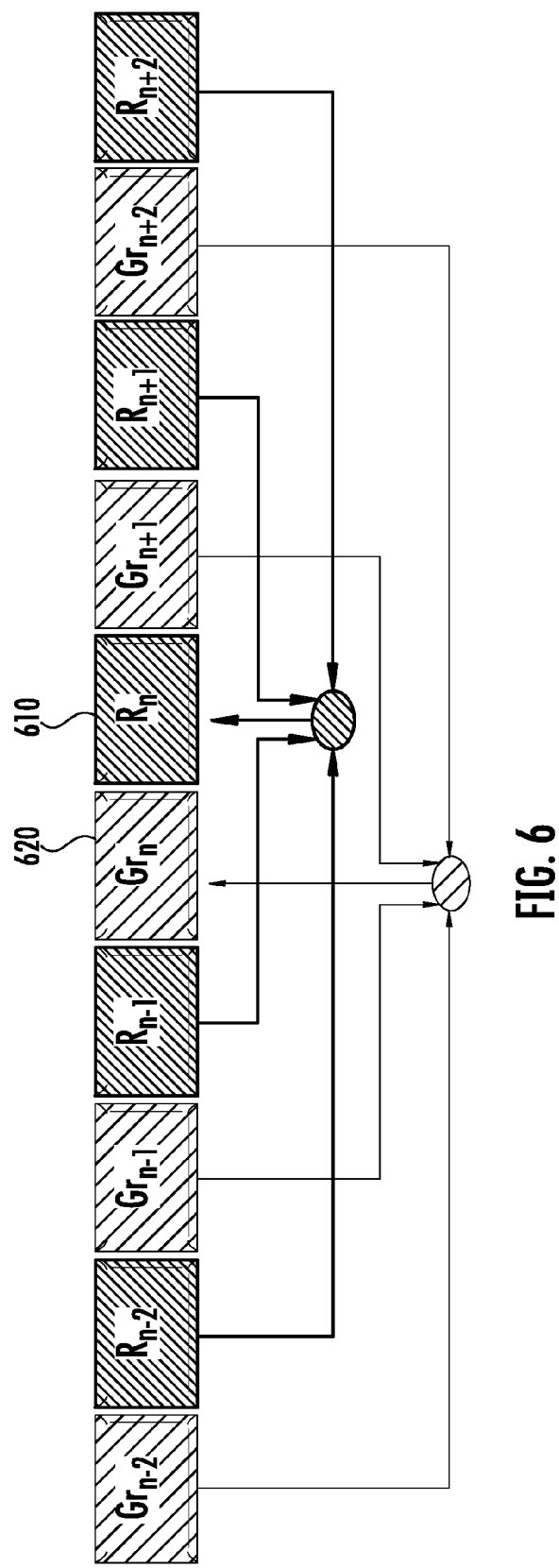
FIG. 6 shows a schematic diagram of kernel processing of a readout from a pixel array.

"Kernel" image processing is an example of an image processing procedure. Kernel image processing involves calculating current pixel output values from surrounding pixels. That is, for example, for a pixel P, values for pixels preceding pixel P, i.e. $P_{n+1}$, $P_{n+2}$, and values for pixels following pixel P, i.e. $P_{n-1}$ and $P_{n-2}$ are used in calculating values for P. FIG. 6 shows a red pixel, R, 610 and a green pixel, Gr, 620 in a readout. Values from the surrounding pixels $R_{n+1}$, $R_{n+2}$, $R_{n-1}$, and $R_{n-2}$ and $Gr_{n+1}$, $Gr_{n+2}$, $Gr_{n-1}$ and $Gr_{n+2}$ may be used in calculating values for R and Gr respectively.

If $P_n$ is the last pixel in a first data pathway such as pipeline 320 in the arrangement shown in FIG. 3, or the first pixel in a second data pathway such as pipeline 321 in the arrangement of FIG. 3, then there is no data corresponding to the pixel subsequent to or preceding $P_n$, respectively. Hence, the functional block which carries out the kernel processing will not be able to calculate pixel output values for P correctly.

Figure 7:
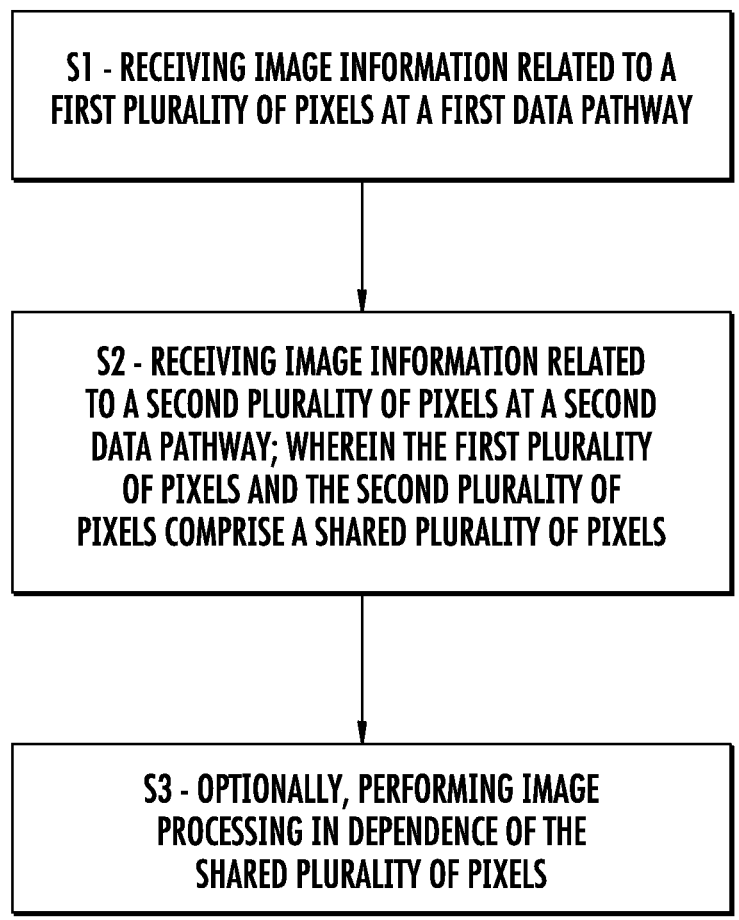
FIG. 7 shows a flowchart of a method of receiving data from pixel array.

A method is shown in FIG. 7 to enable kernel processing for parallel pipelines. The method includes, in a first step, S1 receiving image information related to a first plurality of pixels at a first pathway and in a second step S2, receiving image information related to a second plurality of pixels at a second data pathway, where the first plurality of pixels and the second plurality of pixels having a shared plurality of pixels.

The method may include performing image processing that is dependent on image information related to the shared plurality of pixels in a third step S3.

Figure 8:
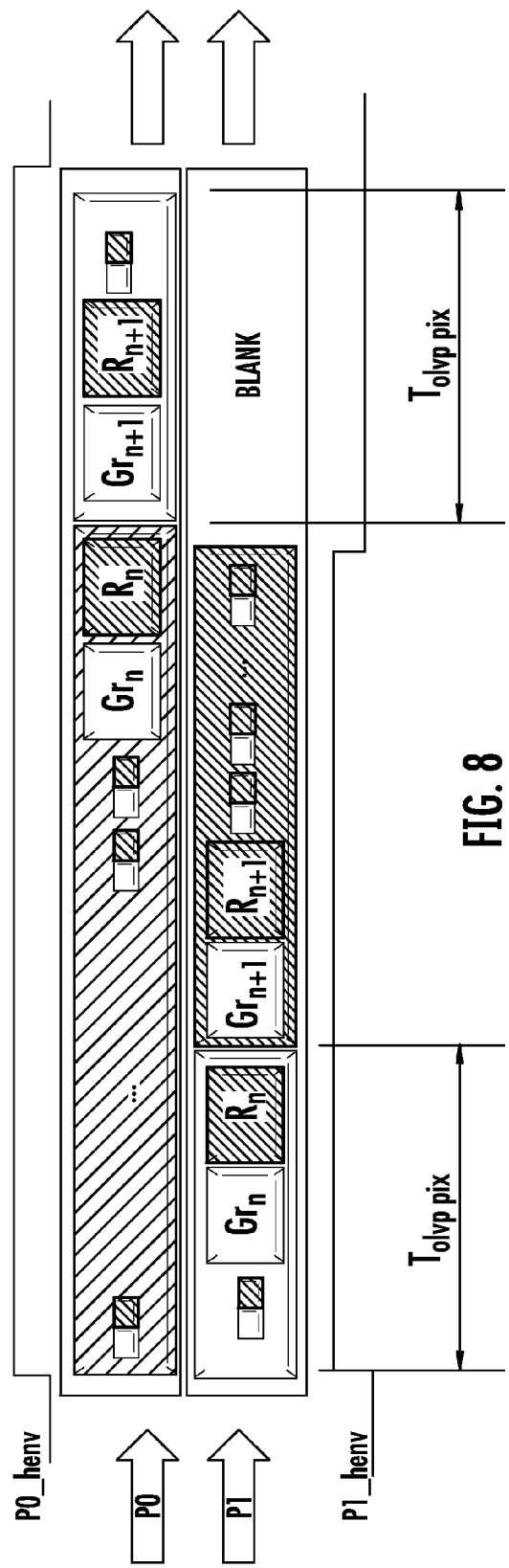
FIG. 8 shows a schematic diagram of data in two video pipes.

As depicted in FIG. 8, an overlap of pixels, or shared plurality of pixels, is provided in each data pathway, or pipeline. That is, pipeline 820 receives data, i.e. image information, from pixels that also provide data to pipeline 821. For example, as can be seen in FIG. 8, data corresponding to pixels $Gr_{n-1}$ and $R_{n-1}$ is received in both first pipeline 820 and second pipeline 821. Thus, kernel image processing taking place using the data of pipe 820 has the data necessary to calculate $Gr_n$ and $R_n$ which would otherwise have been the first pixels in the pipe. Thus, each pipe has the data required for kernel processing.

Processing time over the pixel line is increased by a time period $T_{ovlp}$ which may be accommodated within line blanking as shown in FIG. 8.

Figure 9:
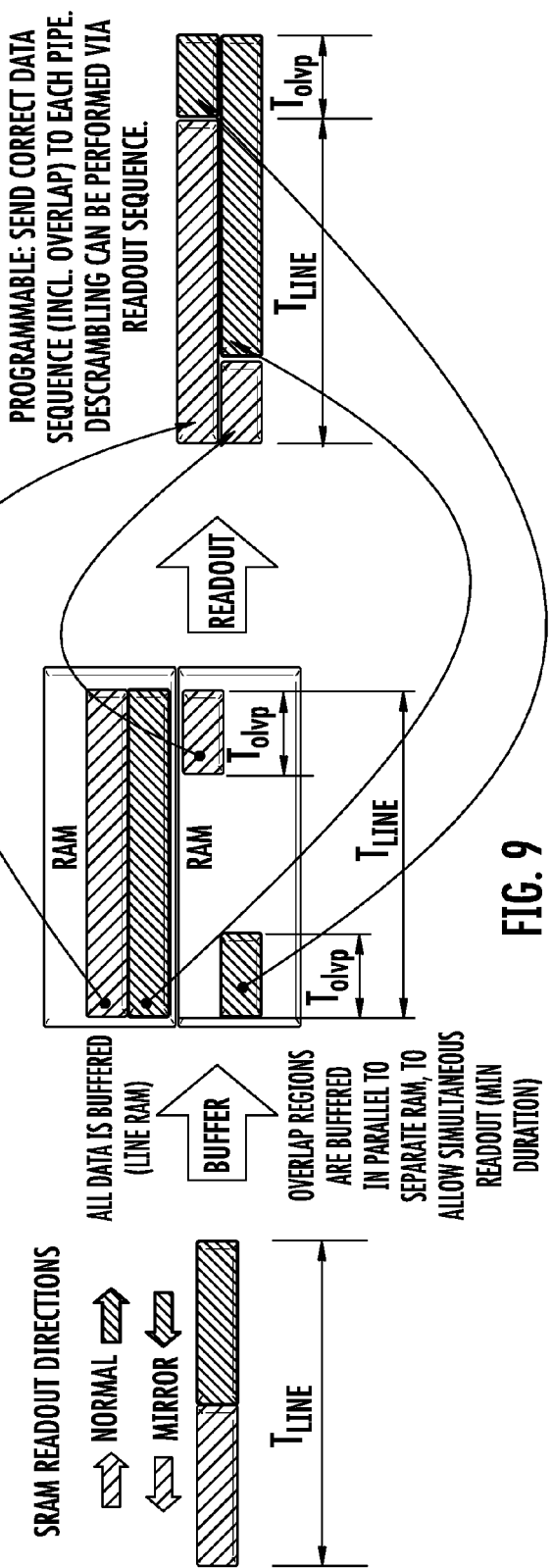
FIG. 9 shows a schematic diagram of buffered data.

To ensure each pipe receives the overlapping pixel data, data buffering is used. The options for buffering may depend on SRAM readout directions. A balance may be struck between buffer size and line-process duration. As shown in FIG. 9, for normal or mirror read out directions, all data is buffered and the overlap regions are buffered in parallel to separate RAM. Simultaneous readout may be achieved. If the data is read out from the pixel array in a scrambled order, descrambling may be performed via the RAM readout sequence.

Figure 10:
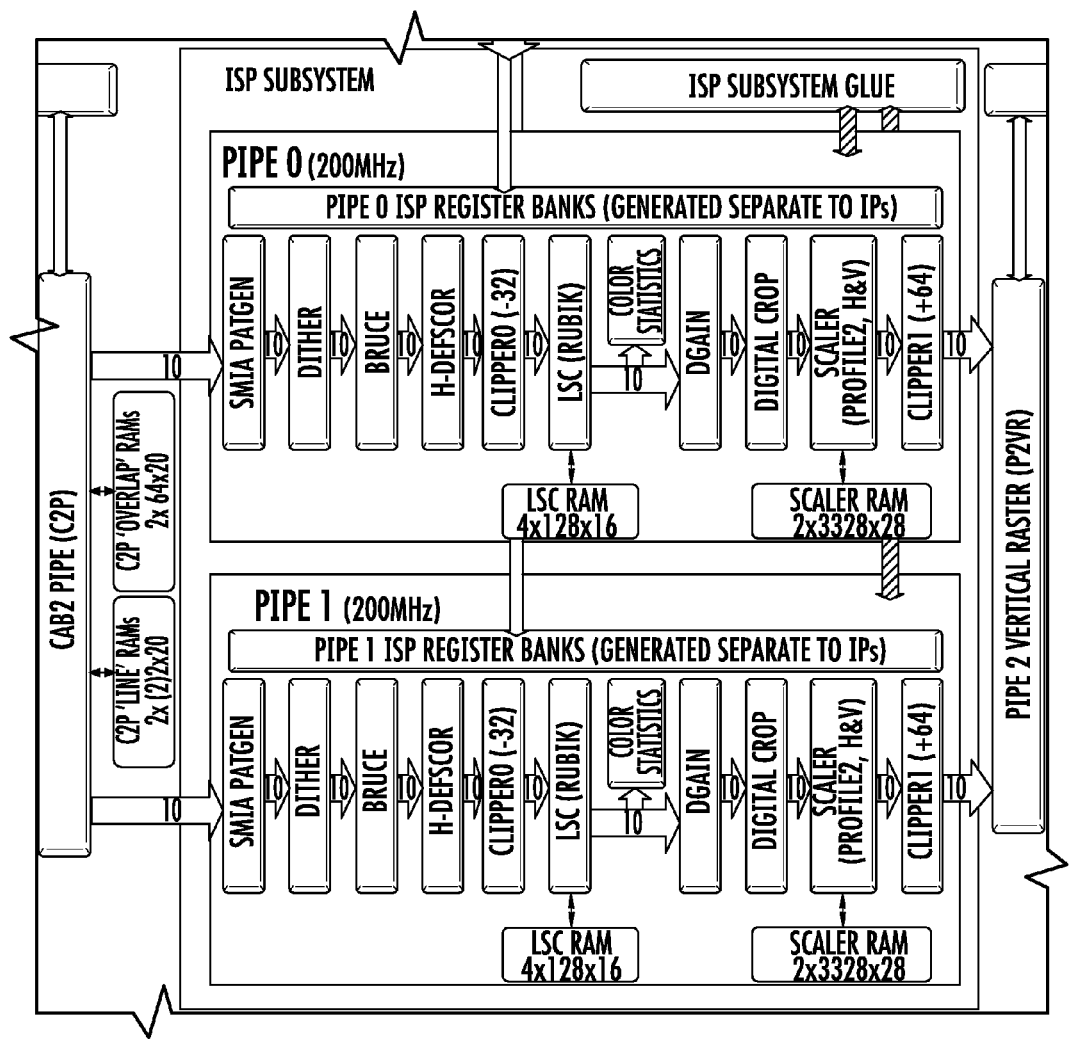
FIG. 10 shows a block diagram of image processing modules for a parallel pipeline.

FIG. 10 shows a block diagram of the functional modules of parallel data pipelines. The pixel array and readout to pipe module is programmable such that the correct data sequence (including overlap) can be sent to each pipeline.

At the end of the data pathway or pipeline, the data from parallel pipelines is recombined to a single stream, for example in vertical raster format. Data from the overlap pixels may be removed as they are no longer required.

In some embodiments, the number of parallel pipes is two. In other embodiments, more than two parallel pipes may be provided.

Figure 12:
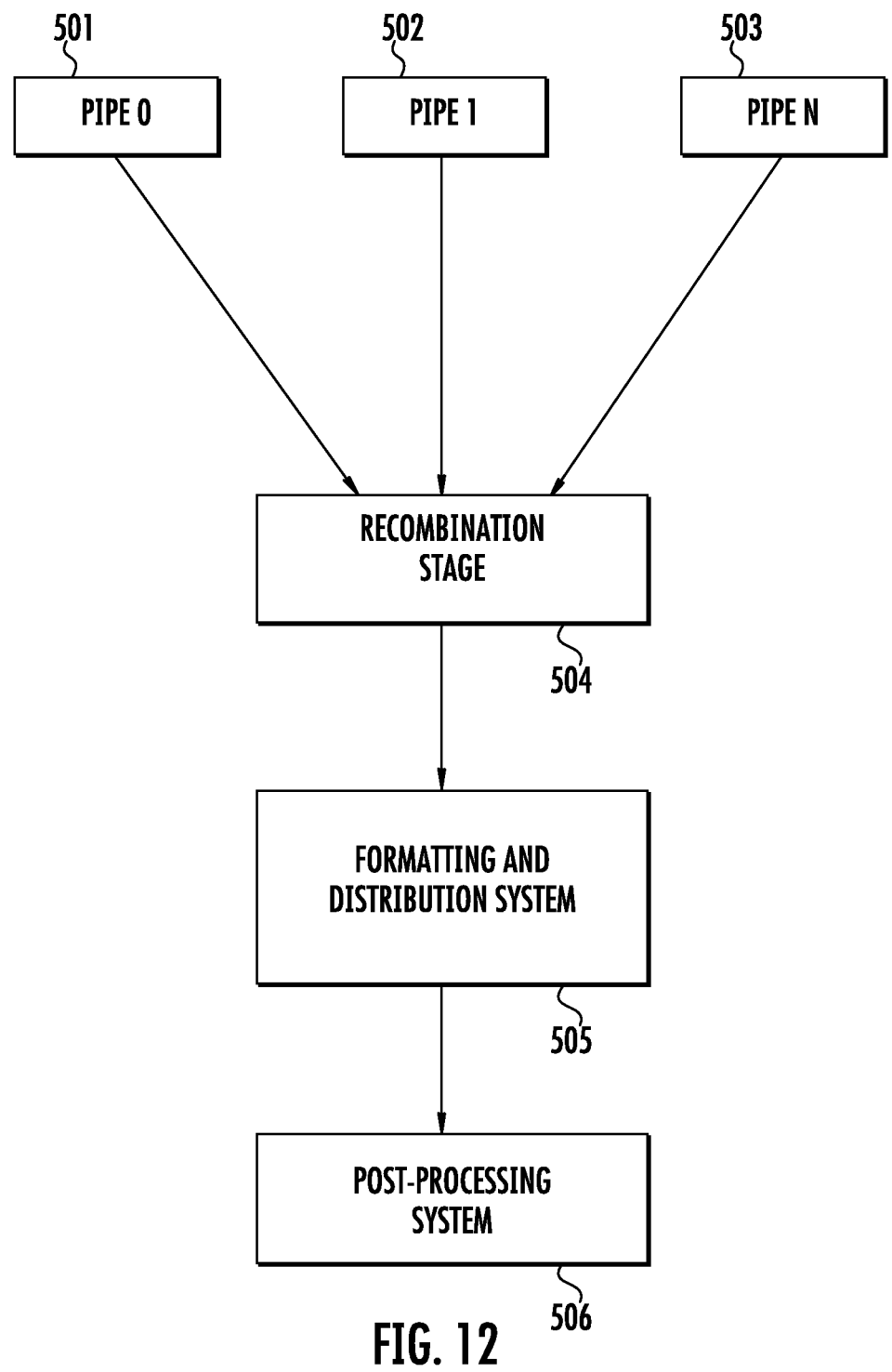
FIG. 12 shows a block diagram of image processing modules for a parallel pipeline and subsequent image processing modules.

Reference is made to block diagram of FIG. 12. In some embodiments n pipelines can be used, where n can be any integer equal to or greater than 2. The previously described embodiments have two pipelines.

In some embodiments parallel readouts from the pixel array have a matching number of processing pipelines, 501, 502, and 503. In other embodiments the number of processing pipes may be determined by the amount of data from the pixel array, for example the pixel array size, and the frame rate. The parallel readouts may utilize pixel overlap techniques such as those previously discussed, for example to remove 'seam' artifacts. Some embodiments may use a relatively high clock frequency for the capture and transmission of video-data. For example, to provide data rates suitable for applications such as high and ultra-high definition video, where typical frame rates may range from 24 to 120 frames per second or even higher.

In some embodiments a relatively high video bandwidth may be maintained throughout the system. In some embodiments the outputs of the parallelized processing pipes are sequenced into an n-pixel wide, vertical-raster VR pattern, containing a single line of processed image data by a recombination stage 504. In some embodiments the redundant overlap data may be discarded at this stage. For example, in a two pipe system as discussed previously, the line contains the left, then right halves of the image. In other embodiments, other combinations of readout directions may be used instead.

The output may be serialized through, for example, an industry-standard high-speed protocol or interface such as the Mobile Industry Processor Interface standard for camera serial interface/physical layer MIPI CSI2/D-PHY.

In some embodiments the VR output may be fed through a formatting and distribution sub-system 505. The formatting distribution subsystem may perform any suitable processing such as one or more of formatting, serialization of data, packetization, and/or the like. A first in first out FIFO may convert video data from pixel to byte format, for example M-bytes. The formatting and distribution subsystem may add transmission protocol packetization and distribute the VR data too, for example, M-byte based transmission lanes. The data rate is maintained by ensuring that the clock frequency is supported by the number of lanes×serializer speed.

This may provide a downstream system with a relatively high clock frequency that may be used directly for processing. Overhead in the post-processing system 506 may be avoided because the downstream system may require no knowledge or post-processing of the parallelization or overlap techniques in order to use the data stream.

Some embodiments may allow different lengths of data to be processed in each pipe, allowing the 'seam' to be located off-horizontal center within the image. Some embodiments may allow for there to be data in only one pipe. In some embodiments the recombined VR output may be generated at the same clock frequency used for the processing pipes. In some embodiments the clock frequency may be maintained through the increase in data-width at the recombination stage. In some embodiments this may allow the number of clocks in the device to be minimized, for example, one clock frequency for video capture, processing and recombination, and another clock frequency for relatively higher-speed transmission of the data. In some embodiments this may reduce, for example, electromagnetic interface EMI risks.

Figure 13:
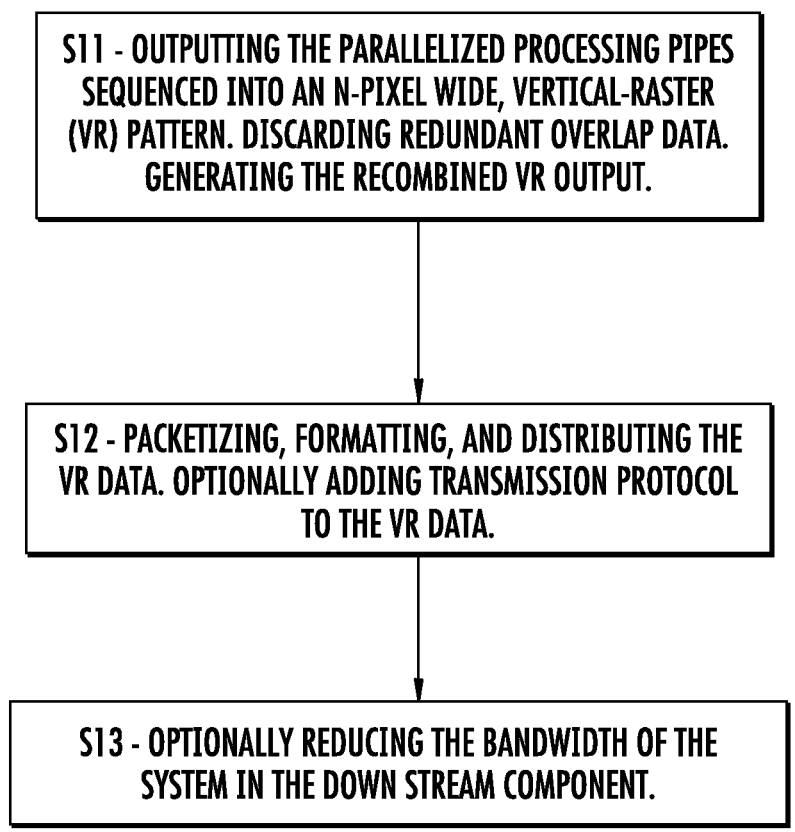
FIG. 13 shows a flowchart of a method processing image data from the parallel pipeline.

A method of one embodiment is shown in FIG. 13. In step S11, one or more of outputting the parallel processing pipes, discarding the redundant overlap data, and generating the recombined VR output is carried out in some embodiments. Step S11 may produce a line-based, sequential pixel output. This may be carried out in block 504 of FIG. 12.

Step S12 comprises one or more of packetizing, formatting and distributing the VR data. Optionally a transmission protocol may also be added to the VR data. In some embodiments, S12 may be carried out in block 505 of FIG. 12.

The method may reduce the bandwidth of the system in step S13, such that the speed of the processing may be slowed and/or image size reduced to match. In some embodiments, S13 may be carried out in block 506 of FIG. 12.

Figure 14:
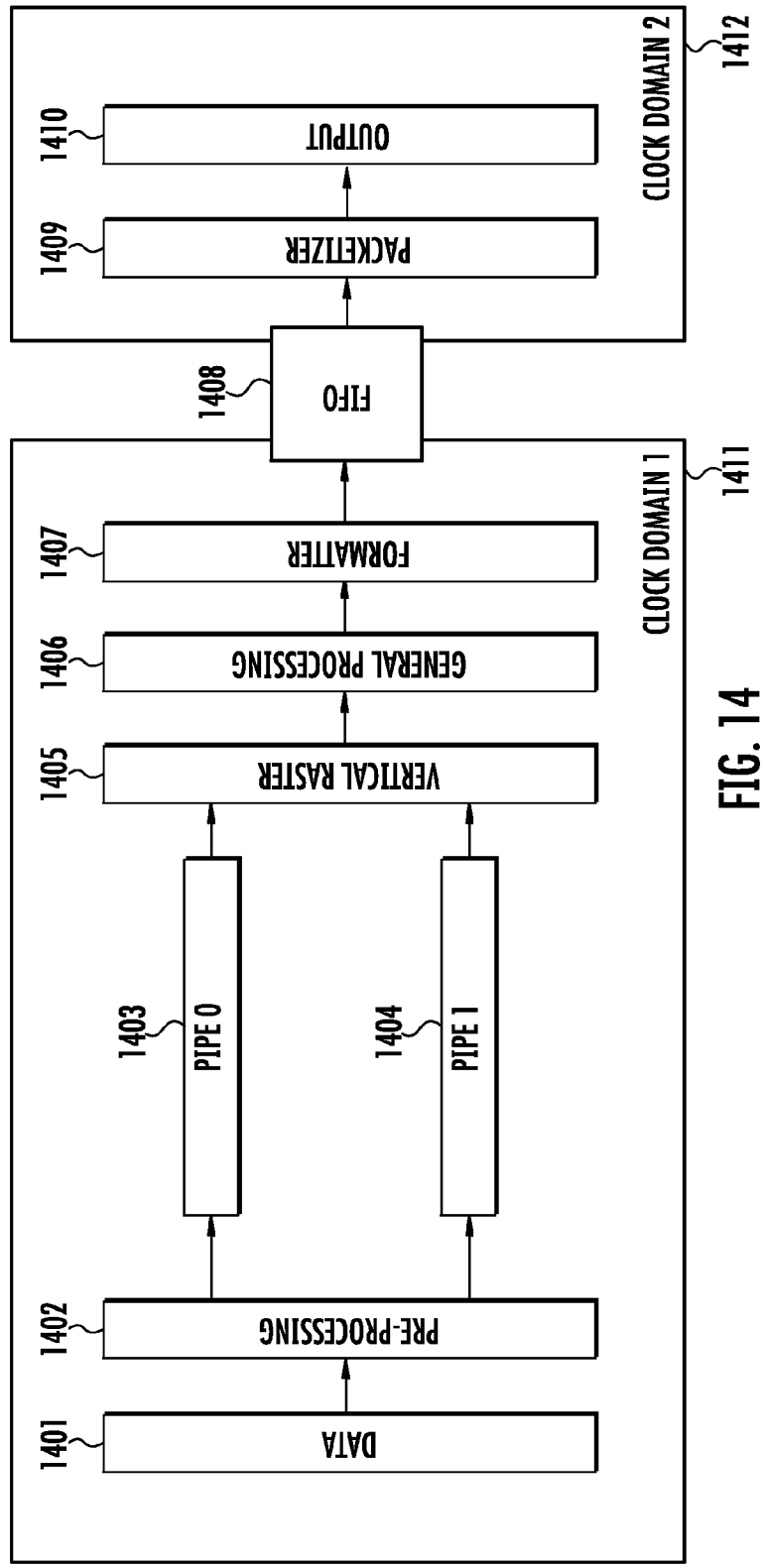
FIG. 14 shows a block diagram of image processing modules for the system, having two processing clock domains.

The process is now described with reference to the block diagram of FIG. 14, which shows some of the blocks of FIG. 12 in more detail in one embodiment. A clock domain 1411 with a first clock speed will now be described. Data captured by the pixel array may be input to the system at block 1401. The data may then be passed to a pre-processing stage 1402. The data may then be passed to at least two pipelines 1403, and 1404 (for example as shown in detail in FIG. 10). The data may then be recombined into vertical raster data by the vertical raster block 1405. Processing may then be performed on the vertical raster data by processing block 1406. This may be omitted in some embodiments. The data may then be formatted into a desirable format by formatting block 1407, for example, a standard mobile imaging architecture, raw image RAW, red, green and blue RGB, or Joint Photographic Experts Group JPEG format.

In some embodiments an asynchronous first in first out FIFO block 1408, for example, a pixel to word first in first out P2W FIFO, may receive the data at the clock frequency of the first clock domain 1411 and transmit the data to a packetizer 1409 at a clock frequency of a second clock domain. The FIFO block thus spans the clock domain 1411 at the first clock frequency and the second clock domain at the second clock frequency 1412. The clock frequency of the second clock domain 1412 may be higher than that of the clock frequency of the first clock domain 1411, in other embodiments it may be the same or lower.

The packetizer 1409 may then process the data into packets at the clock frequency of the second clock domain 1412, for example camera serial interface CSI2TX packets. The data may then be transmitted by the system at the output 1410.

Figure 15:
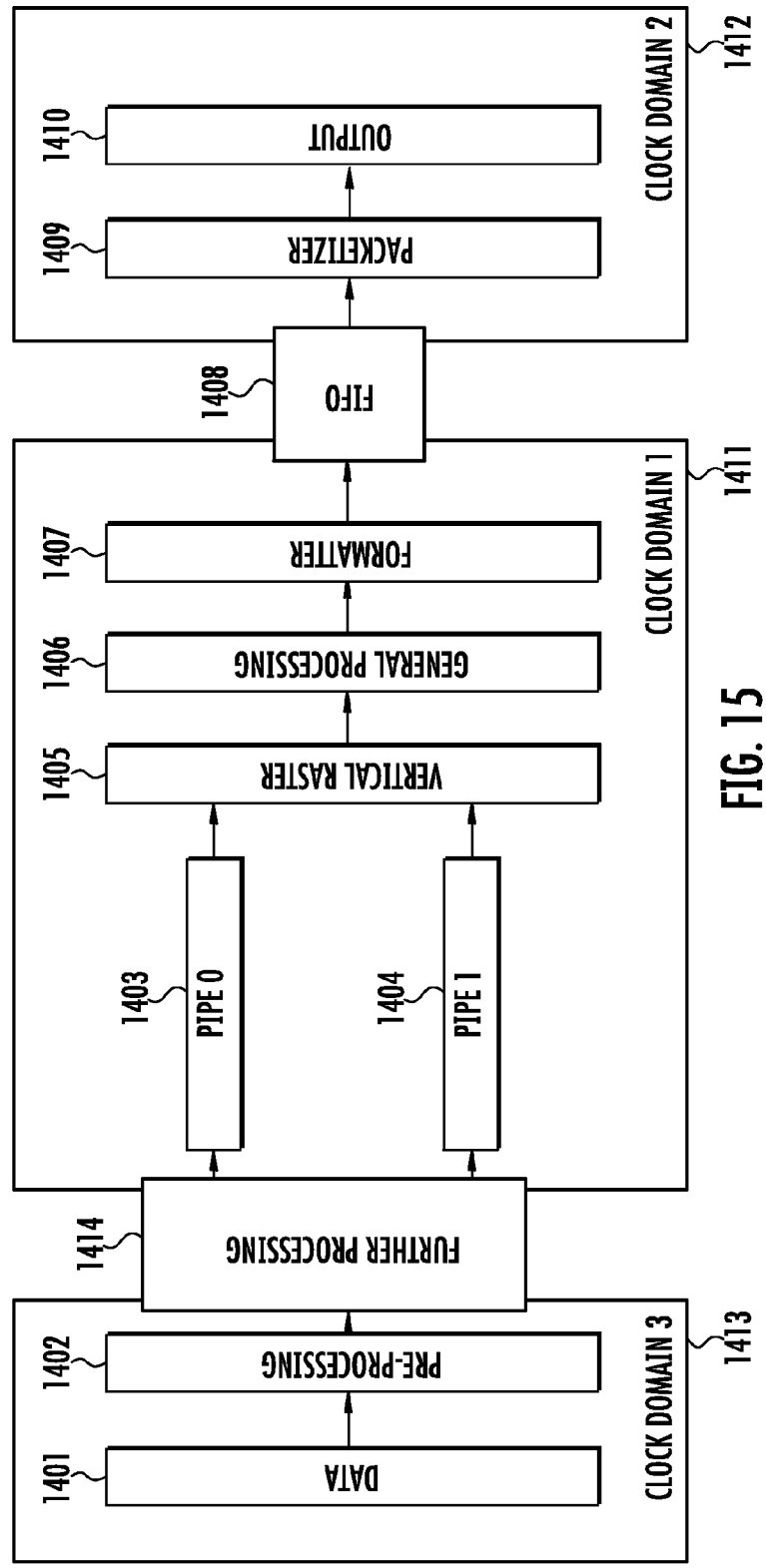
FIG. 15 shows a block diagram of image processing modules for the system, having three processing clock domains.

The process is now described with reference to the block diagram of FIG. 15 which shows another embodiment. FIG. 15 shows that in some embodiments a third clock domain 1413 may be utilized before the first and second clock domains 1211, and 1212 respectively. In this embodiment the SRAM, as previously described, may operate at a different clock frequency to that of the pipelines 1403, and 1404. A further processing block 1414 may straddle the first and third clock domain 1411, and 1413 respectively. The clock frequency of the third clock domain 1413 may be higher than that of the clock frequency of the first domain 1411, in other embodiments it may be the same or lower. The clock frequency of the third clock domain 1413, may be different to that of the first and second clock domains 1411, and 1412. It should be appreciated that the clock frequency of the third clock domain 1413 may be higher than that of the clock frequency of the first clock domain 1411 and/or second clock domain 1412, in other embodiments it may be lower. In some embodiments the clock frequency of the third clock domain and the clock frequency of the second clock domain may be the same, in other embodiments it may be different. This embodiment may allow a more flexible and efficient relationship between the pixel array and the video processing pipelines.

It should be appreciated that kernel processing has been described in some embodiments. Alternatively or additionally, embodiments may be used with any other suitable processing.

It is also noted herein that while the above describes example embodiments, there are several variations and modifications which may be made to the disclosed approach without departing from the scope of the present invention.

Figure 11:
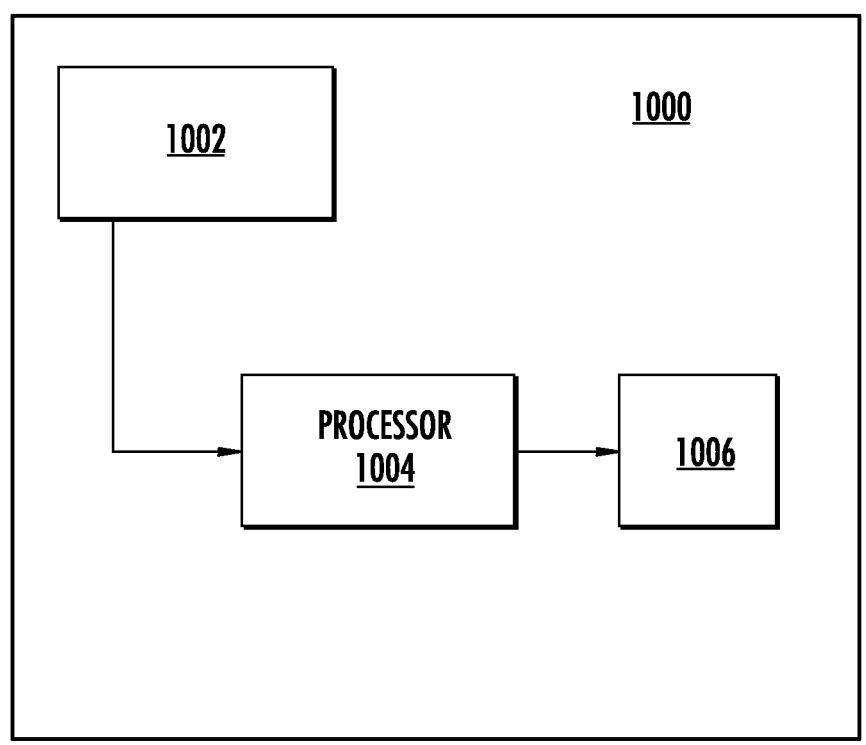
FIG. 11 shows a schematic view of an imaging system comprising a pixel array.

A method such as that described with reference to FIG. 7 may be implemented in an imaging system 100 as shown in FIG. 1. For example, a method according to that shown in FIG. 7 may be implemented in hardware and/or firmware for system control and/or image processing. Some embodiments may be provided in a device 1000 such as shown in FIG. 11. The device 1000 may comprise a pixel array or array of pixel arrays as previously described which are referenced 1002. An output from the pixel or pixel array may be provided to a processor 1004. The processor 1004 may include a processing module. The output of the processor may control for example a display 1006 and allow the captured image or signal to be displayed, for example as a video.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should be appreciated that the device may be any suitable device. By way of example only and without limitation, that device may be a mobile telephone, smart phone, tablet, computer, camera or the like.

Various embodiments with different variations have been described above. It should be noted that those skilled in the art may combine various elements of these various embodiments and variations. Such alterations, modifications, and improvements are intended to be part of this disclosure, and are intended to be within the scope of the present invention. Accordingly, the foregoing description is by way of example only and is not intended to be limiting. The present invention is limited only as defined in the following claims and the equivalents thereto.

The invention claimed is:

1. A method comprising:
   generating a first data stream related to a first plurality of pixels of a pixel array, the first data stream comprising first data sequentially arranged in a readout direction;
   generating a second data stream related to a second plurality of pixels of the pixel array, the second data stream comprising second data sequentially arranged in the readout direction, the first plurality of pixels and the second plurality of pixels being spatially non-overlapping portions of the pixel array;
   generating first image information by appending an initial portion of the second data stream to the first data stream, the initial portion of the second data stream being sequentially arranged after the first data stream in the readout direction;
   generating second image information by appending a terminal portion of the first data stream to the second data stream, the terminal portion of the first data stream being sequentially arranged before the second data stream in the readout direction, wherein the appending of the initial portion of the second data stream to the first data stream and the appending of the terminal portion of the first data stream to the second data stream cause the first image information and the second image information to comprise a shared plurality of pixels;
   receiving the first image information at a first data pathway;
   receiving the second image information at a second data pathway;
   performing image processing on the first data pathway and the second data pathway; and
   combining data output from the first and second data pathways into a stream of data where stream output is generated using a first clock frequency which is substantially the same as that used in the first and second data pathways.

2. The method according to claim 1, further comprising processing said combined data.

3. The method according to claim 1, wherein the processing comprises one or more of formatting, packetizing, and distributing the combined data.

4. The method according to claim 1, further comprising receiving data at the first clock frequency at an input to a first in first out FIFO processor, and transmitting the data from an output of the FIFO processor at a second clock frequency.

5. The method according to claim 4, wherein the second clock frequency is greater than the first clock frequency.

6. The method according to claim 1, wherein a further processing unit processes the data using a third clock frequency, wherein the processed data is output to provide the image information to the first and second pathways.

7. The method according to claim 1, wherein the image processing comprises kernel image processing.

8. The method according to claim 1, wherein the first data stream is stored in a first memory and the second data stream is stored in a second memory.

9. The method according to claim 1, wherein a number of the first plurality of pixels and a number of the second plurality of pixels are equal.

10. The method according to claim 1, wherein the number of the first plurality of pixels and the number of the second plurality of pixels are different.

11. The method according to claim 1, further comprising buffering the image information related to the first and the second pluralities of pixels.

12. An apparatus comprising:
   a first memory configured to store a first data stream related to a first plurality of pixels of a pixel array, the first data stream comprising first data sequentially arranged in a readout direction;
   a second memory configured to store a second data stream related to a second plurality of pixels of the pixel array, the second data stream comprising second data sequentially arranged in the readout direction, the first plurality of pixels and the second plurality of pixels being spatially non-overlapping portions of the pixel array;
   a third memory configured to store an initial portion of the second data stream;
   a fourth memory configured to store a terminal portion of the first data stream;
   a data processor configured to generate first image information by appending the initial portion of the second data stream to the first data stream, the initial portion of the second data stream being sequentially arranged after the first data stream in the readout direction, the data processor being further configured to generate second image information by appending a terminal portion of the first data stream to the second data stream, the terminal portion of the first data stream being sequentially arranged before the second data stream in the readout direction, wherein the appending of the initial portion of the second data stream to the first data stream and the appending of the terminal portion of the first data stream to the second data stream cause the first image information and the second image information to comprise a shared plurality of pixels;
   a first data pathway configured to receive the first image information;
   a second data pathway configured to receive the second image information at a second data pathway; and
   an image processor configured to perform image processing on the first data pathway and the second data pathway, and to combine data output from said first and second data pathways into a stream of data where stream output is generated using a first clock frequency which is substantially the same as that used in said first and second data pathways.

13. The apparatus according to claim 12, wherein said image processor configured to process said combined data.

14. The apparatus according to claim 12, wherein said image processor is configured to perform one or more of formatting, packetizing, and distributing said combined data.

15. The apparatus according to claim 12, further comprising a first in first out FIFO processor configured to receive data at said first clock frequency at an input to said first in first out FIFO processor, and transmit the data from an output of the FIFO processor at a second clock frequency.

16. The apparatus according to claim 15, wherein the second clock frequency is greater than the first clock frequency.

17. The apparatus according to claim 12, further comprising an input function configured to receive data using a third clock frequency, and output said image information to said first and second pathways.

18. The apparatus according to claim 12, wherein the image processing comprises kernel image processing.

19. The apparatus according to claim 12, wherein a number of the first plurality of pixels and a number of the second plurality of pixels are equal.

20. The apparatus according to claim 12, wherein a number of the first plurality of pixels and a number of the second plurality of pixels are different.

21. The apparatus according to claim 12, comprising a buffer configured to buffer the image information related to the first and the second pluralities of pixels.

22. A non-transitory computer readable medium having executable instructions that when executed are configured to cause one or more processors to:
generate a first data stream related to a first plurality of pixels of a pixel array, the first data stream comprising first data sequentially arranged in a readout direction;
generate a second data stream related to a second plurality of pixels of the pixel array, the second data stream comprising second data sequentially arranged in the readout direction, the first plurality of pixels and the second plurality of pixels being spatially non-overlapping portions of the pixel array;
generate first image information by appending an initial portion of the second data stream to the first data stream, the initial portion of the second data stream being sequentially arranged after the first data stream in the readout direction;
generate second image information by appending a terminal portion of the first data stream to the second data stream, the terminal portion of the first data stream being sequentially arranged before the second data stream in the readout direction, wherein the appending of the initial portion of the second data stream to the first data stream and the appending of the terminal portion of the first data stream to the second data stream cause the first image information and the second image information to comprise a shared plurality of pixels;
receive the first image information related to a first plurality of pixels at a first data pathway;
receive the second image information related to a second plurality of pixels at a second data pathway; and
combine data output from the first and second data pathways into a stream of data where stream output is generated using a first clock frequency which is substantially the same as that used in said first and second data pathways, wherein the first plurality of pixels and the second plurality of pixels comprises a shared plurality of pixels.

23. The non-transitory computer readable medium of claim 22, further comprising instructions to perform image processing using image information related to the shared plurality of pixels.

24. The non-transitory computer readable medium of claim 22, further comprising instructions to buffer the image information related to the first and the second pluralities of pixels.

25. The non-transitory computer readable medium of claim 24, further comprising instruction to buffer the image information relating to the shared plurality of pixels in parallel to the image information relating to an unshared plurality of pixels of the first plurality of pixels and the second plurality of pixels.

* * * * *